United States Patent
Papenfus

(10) Patent No.: US 10,499,659 B2
(45) Date of Patent: Dec. 10, 2019

(54) WINDPIPE REMOVAL DEVICE AND METHOD

(71) Applicant: Jeffery Dean Papenfus, Elkhorn, WI (US)

(72) Inventor: Jeffery Dean Papenfus, Elkhorn, WI (US)

( * ) Notice: Subject to any disclaimer, the term of this patent is extended or adjusted under 35 U.S.C. 154(b) by 0 days.

(21) Appl. No.: 16/267,220

(22) Filed: Feb. 4, 2019

(65) Prior Publication Data
US 2019/0239522 A1 Aug. 8, 2019

Related U.S. Application Data

(60) Provisional application No. 62/709,928, filed on Feb. 5, 2018.

(51) Int. Cl.
| | |
|---|---|
| A22B 5/00 | (2006.01) |
| A22B 5/06 | (2006.01) |
| A01M 31/00 | (2006.01) |
| A22B 5/16 | (2006.01) |
| A22B 3/10 | (2006.01) |

(52) U.S. Cl.
CPC ........... *A22B 5/0005* (2013.01); *A01M 31/00* (2013.01); *A22B 5/0047* (2013.01); *A22B 5/06* (2013.01); *A22B 3/10* (2013.01); *A22B 5/16* (2013.01)

(58) Field of Classification Search
CPC ..................................................... A22B 5/00
USPC .................... 452/102–106, 149, 198
See application file for complete search history.

(56) References Cited

U.S. PATENT DOCUMENTS

| | | | | |
|---|---|---|---|---|
| 2,802,234 | A * | 8/1957 | Cunkelman | A22B 5/14 452/106 |
| 3,659,611 | A * | 5/1972 | Miller | A61M 16/0465 128/207.15 |
| 4,317,257 | A * | 3/1982 | Engel | A22B 5/161 294/74 |
| 4,924,551 | A * | 5/1990 | Greenbank | A22B 5/14 138/89 |
| 5,285,777 | A * | 2/1994 | Beckwith | A61M 16/0465 128/207.15 |
| 5,741,177 | A * | 4/1998 | Roberts | A22B 5/0064 452/198 |
| 5,813,165 | A * | 9/1998 | Dougherty, Sr. | A01M 23/34 43/42.06 |
| 6,053,129 | A * | 4/2000 | Akre | A01K 27/005 119/795 |
| 6,089,944 | A * | 7/2000 | Bergkvist | A63H 33/006 446/124 |
| 7,252,583 | B1 * | 8/2007 | Jones | A22B 5/0005 452/102 |

(Continued)

*Primary Examiner* — Richard T Price, Jr.
(74) *Attorney, Agent, or Firm* — Robert C. Corbett; Timothy Stevens; Technology Law, PLLC

(57) ABSTRACT

A device for removing the windpipe of a harvested big game animal such as the windpipe of a deer. The device includes: (a) a line having a first end and a second end; and (b) a tapered member having an apex and a base. In use, the neck of a field dressed big game animal is cut open to reveal the windpipe of the animal. The first end of the line of the device is then passed into and through the windpipe so that the first end of the line is positioned in the body cavity of the animal. Then the first end of the line is pulled so that the tapered member engages the windpipe to remove the windpipe from the neck of the animal.

13 Claims, 3 Drawing Sheets

(56) References Cited

U.S. PATENT DOCUMENTS

| | | | | |
|---|---|---|---|---|
| 7,264,544 B2 * | 9/2007 | Tokarski | ................ | A22B 5/06 |
| | | | | 452/198 |
| 7,896,851 B2 * | 3/2011 | Ueno | ................ | A61N 1/0575 |
| | | | | 600/509 |
| 9,808,258 B2 * | 11/2017 | Weiner | ............... | A61B 17/1285 |
| 9,814,618 B2 * | 11/2017 | Nguyen | ................ | A61F 7/007 |

* cited by examiner

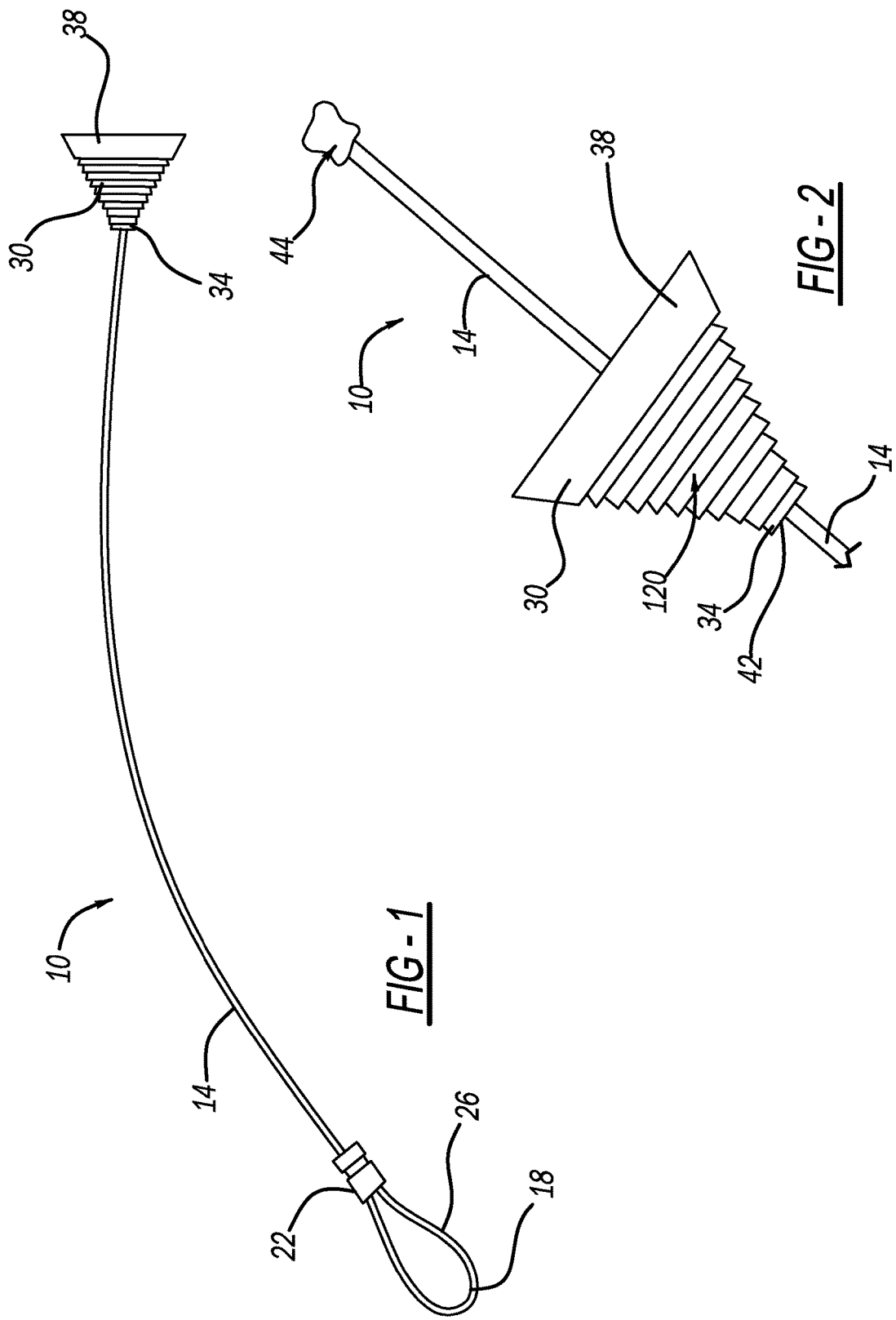

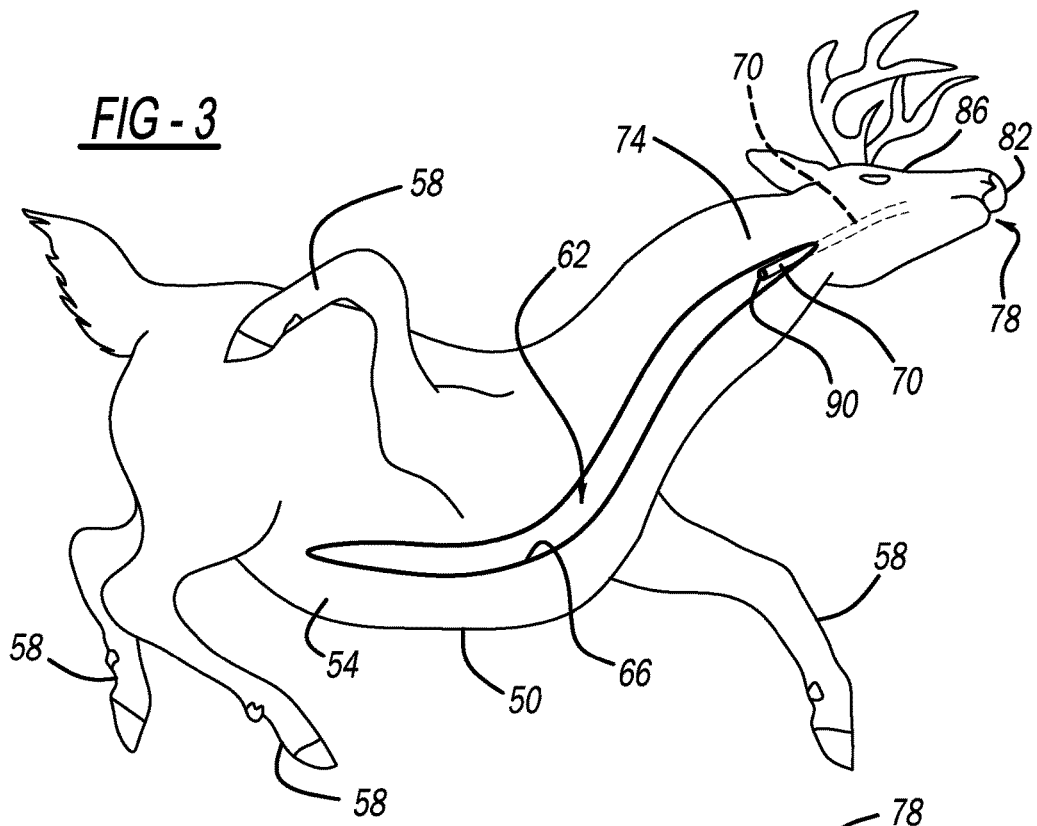
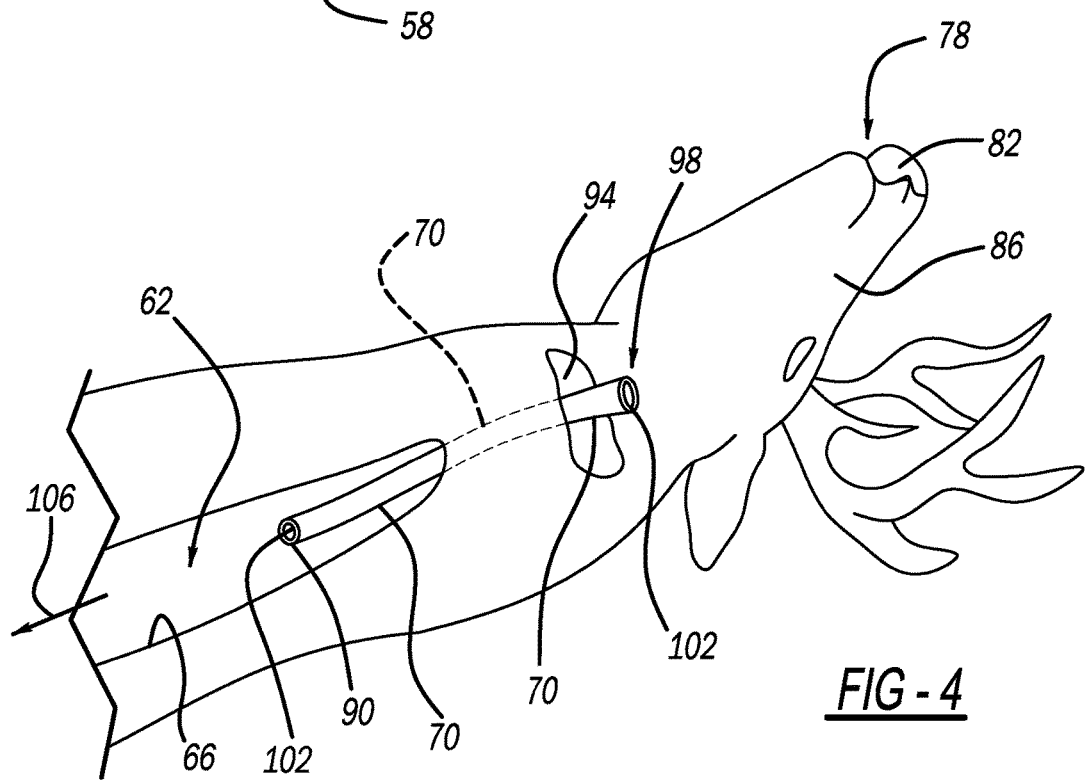

WINDPIPE REMOVAL DEVICE AND METHOD

CROSS-REFERENCE TO RELATED APPLICATION

This application claims the benefit of U.S. Provisional Application No. 62/709,928, filed Feb. 5, 2018, and which is hereby incorporated by reference in its entirety.

TECHNICAL FIELD

This disclosure relates to devices and methods for field dressing big game animals such as deer.

BACKGROUND

After harvesting a large animal, such as deer, elk, etc., the body cavity is typically opened and the internal organs are removed. It is best to also remove the windpipe of the animal to promote faster cooling of the game. The windpipe can be removed by a number of prior art methods. One of the prior art systems is the rod and loop system disclosed in U.S. Pat. No. 7,252,583. However, the system of the '583 patent can rip the windpipe leaving a portion of the windpipe behind. It would be an advance in the art if a system were discovered that more easily and surely removed the windpipe of a harvested big game animal.

SUMMARY

A device is provided for removing the windpipe of a harvested big game animal. The device includes a line having a first end and a second end, and a tapered member operatively connected at the second end of the line. The tapered member has an apex and a base. The device facilitates the removal of the windpipe from harvested animals because the line is sufficiently flexible to be passed through the windpipe or a portion thereof without tearing or perforating the windpipe. The tapered member is at least partially inserted into the windpipe and transmits force to the windpipe in a manner that also minimizes or prevents the tearing of the windpipe. A corresponding method is also provided.

The above features and advantages and other features and advantages of the present disclosure are readily apparent from the following detailed description of the best modes for carrying out the disclosure when taken in connection with the accompanying drawings

BRIEF DESCRIPTION OF THE DRAWINGS

FIG. 1 is a schematic, side view of a windpipe removal device;

FIG. 2 is a schematic, side view of a portion of the windpipe removal device;

FIG. 3 is a schematic, perspective view of a harvested and field-dressed deer;

FIG. 4 is a schematic, perspective view of the head, neck and a portion of the torso of the deer, with the windpipe exposed in the neck;

DESCRIPTION OF THE PREFERRED EMBODIMENTS

Figure 5:
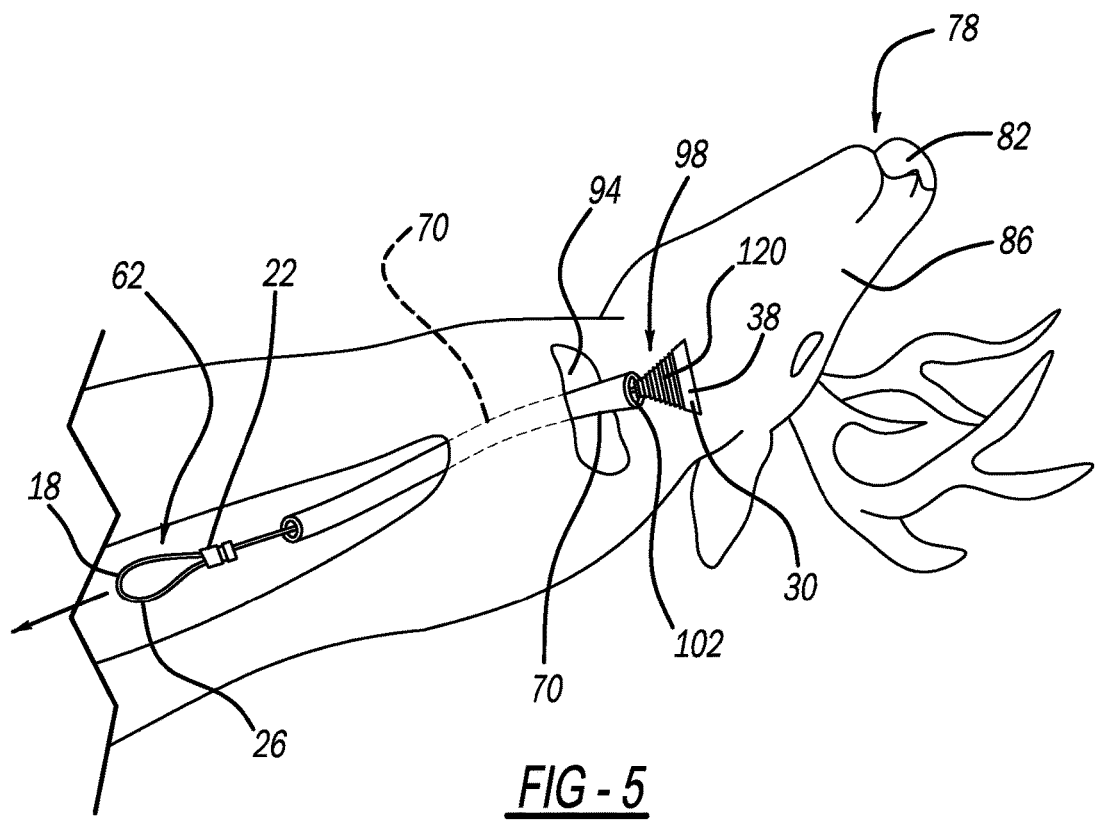
FIG. 5 is a schematic, perspective view of the head, neck and a portion of the torso of the deer with the windpipe removal device extending through a portion of the windpipe.

Referring to FIGS. 1 and 2, wherein like reference numbers refer to like components, therein is shown a windpipe removal device 10. Device 10 comprises a stranded metal line 14 having a first line end 18 that has been looped by crimp 22, thereby forming a loop 26. Device 10 also comprises a tapered member 30. In the embodiment depicted, the tapered member 30 is generally cone-shaped, having an apex 34 at which the member 30 is narrowest and a base 38 at which the member 30 is widest.

The tapered member 30 defines an aperture 42 that extends through the apex 34 and the base 38. The line 14 extends through the aperture 42 and thus extends through the tapered member 30. The tapered member 30 is positioned with respect to the line 14 such that, when the line 14 is straight, the apex 34 is the portion of the member 30 that is closest to the first end 18 and loop 26 and the base 38 is the farthest portion of the member 30 from the first end 18 and loop 26.

Referring specifically to FIG. 2, the device 10 includes another crimp 44 attached to the second line end 46 of line 14. The crimp 44 is larger than the aperture 42 at the apex 34, thus preventing the movement of the second end 46 through the apex 34 and thereby retaining the member 30 with respect to the line 14. It should be noted that other techniques for securing the tapered member 30 with respect to the second line end 46 may be employed within the scope of the claimed invention. Furthermore, the tapered member 30 is hollow, and thus the aperture 42 is conical in the embodiment depicted. However, the tapered member may be either hollow or substantially solid within the scope of the claimed invention.

Referring to FIG. 3, wherein like reference numbers refer to like components from FIGS. 1 and 2, a large game animal 50 is schematically depicted. The animal 50 in the embodiment depicted is a deer, though the device 10 may be used with any large game animal within the scope of the claims. As understood by those skilled in the art, the large game animal 50 includes a torso 54 from which four legs 58 extend. The torso 54 defines a body cavity 62 that contains internal organs of the animal's digestive system, such as stomach and intestines, and the cardiovascular system, such as heart and lungs. The animal 50 shown in FIG. 3 has been field dressed. More specifically, an incision 66 has been made in the torso 54 through which internal organs have been removed, including the lungs.

As understood by those skilled in the art, a windpipe 70 extends from the cavity 62, through the animal's neck 74, to the animal's mouth 78 and/or nose 82 in the head 86. The windpipe 70, also commonly referred to as a "trachea," connected the lungs to the nose 82 or mouth 78 prior to removal of the lungs from the cavity 62. After removal of the lungs, a first windpipe end 90 remains in the cavity 62.

A method of using of the device 10 may include forming a cut 94 in the neck 74 of the animal 50 to expose the windpipe 70, as shown in FIG. 4. Referring to FIG. 4, wherein like reference numbers refer to like components from FIGS. 1-3, the method may further include cutting the windpipe 70 at or near the cut 94 in the neck 74 to form a second windpipe end 98. As understood by those skilled in the art, the windpipe 70 defines a passageway 102 that extends therethrough, including from the first windpipe end 90 to the second windpipe end 98.

Referring now to FIG. 5, wherein like reference numbers refer to like components from FIGS. 1-4, the method further includes inserting the first line end 18 into the second windpipe end 98 and through the windpipe 70 so that the first line end 18 is positioned in the body cavity 62 of the animal 50 and the line 14 is inside the windpipe 70. The method further includes pulling the first line end 18 so that the tapered member 30 engages the windpipe 70 to remove the windpipe 70 from the animal 50. More specifically, in the embodiment depicted, pulling the first line end 18 includes exerting a force 106 on the loop 26. Accordingly, the loop 26 functions as a handle at the first line end 18. Other handle configurations may be employed within the scope of the claimed invention. Similarly, and within the scope of the claims, the device 10 may not include any sort of handle at the first line end 18.

Figure 6:
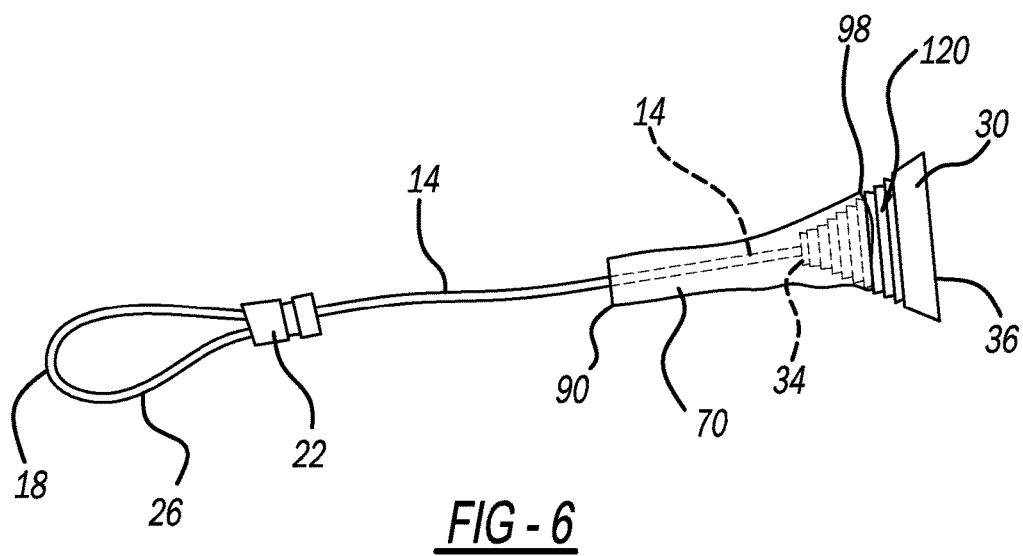
FIG. 6 is a schematic, side view of the windpipe removal device and the windpipe removed from the deer.

As the device 10 is pulled, the tapered member 30 engages the windpipe 70. More specifically, and with reference to FIGS. 5 and 6, the apex 34 enters the passageway 102 at the second windpipe end 98. The tapered member 30 contacts the windpipe 70 and transmits the force 106 from the loop 26 to the windpipe 70 via the tapered member 30, which causes the windpipe 70 to be removed from the animal 50, as shown in FIG. 6.

Referring to FIGS. 1-2 and 5-6, the tapered member 30 in the embodiment depicted includes a plurality of circumferential ridges or ribs 120 that enhance the transfer of the force 106 from the tapered member 30 to the windpipe 70.

The components of the instant invention can be made of any suitable material. However, the line 14 of the instant invention is preferably the stranded stainless steel line shown in the Figures. The tapered member 30 of the instant invention is preferably ribbed as shown to better grip a windpipe. It should be understood that the tapered member 30 can be any three dimensional shape including a sphere and a spheroid although a true cone is highly preferred. The diameter of the base 38 of the cone should be large enough so that the tapered member 30 engages with and then removes a windpipe but no larger than necessary. Most preferably, the line and cone are colored hunter safety orange. As shown, the line 14 includes a polymeric coating.

As used herein, a "line" refers to any cord, cable, or other flexible member. The line 14 has sufficient stiffness to permit it to be threaded through a windpipe, but sufficient flexibility to enable it to bend to conform to the shape of the windpipe and thereby avoid tearing the windpipe.

As used herein, a "crimp" is any member of any material that attaches to a line or that interconnects portions of a line. For example, a crimp may include a ferule of any material.

While the best modes for carrying out the invention have been described in detail, those familiar with the art to which this invention relates will recognize various alternative designs and embodiments for practicing the invention within the scope of the appended claims.

The invention claimed is:

1. A device for removing the windpipe of a harvested big game animal, the device comprising:
    a line having a first end and a second end; and
    a tapered member operatively connected at the second end of the line, said tapered member having an apex and a base;
    wherein the tapered member is generally conical; and
    wherein the tapered member is characterized by a plurality of circumferential ribs.

2. The device of claim 1, wherein the tapered member defines an aperture that extends through the apex and the base, and wherein the line extends through the aperture.

3. The device of claim 2, further comprising a crimp member attached at the second end of the line;
    wherein said crimp member is wider than the aperture.

4. The device of claim 1, wherein the line is stranded metal cable.

5. The device of claim 4, wherein the line includes a polymeric coating around the stranded metal cable.

6. The device of claim 1, further comprising a handle at the first end of the line.

7. The device of claim 6, wherein the handle is formed by a loop of the line.

8. A method for removing the windpipe of a field dressed big game animal having a first windpipe end in a body cavity, the method comprising:
    forming a cut in the neck of the animal to expose the windpipe;
    cutting the windpipe at the neck to form a second windpipe end;
    possessing a device including a line having a first line end and a second line end, and a tapered member operative connected to the line at the second line end, said tapered member having an apex and a base;
    inserting the first line end into the second windpipe end and through the windpipe so that the first line end is positioned in the body cavity of the animal; and
    pulling the first line end so that the tapered member engages the windpipe to remove the windpipe from the animal.

9. The method of claim 8, wherein the tapered member is a cone.

10. The method of claim 9, wherein the cone includes circumferential ribs.

11. The method of claim 8, wherein the device includes a handle at the first line end.

12. The method of claim 11, wherein the handle is a loop formed by the line.

13. A device for removing the windpipe of a harvested big game animal, the device comprising:
    a line having a first end and a second end; and
    a tapered member operatively connected at the second end of the line;
    wherein the tapered member is characterized by a plurality of circumferential ribs.

\* \* \* \* \*